United States Patent [19]
Bilbro et al.

[11] 3,949,189
[45] Apr. 6, 1976

[54] PIPE HEAT TRANSFER ASSEMBLY
[75] Inventors: James E. Bilbro; Ben C. Johnson, both of San Marcos, Tex.
[73] Assignee: Thermon Manufacturing Company, San Marcos, Tex.
[22] Filed: Apr. 22, 1974
[21] Appl. No.: 462,660

Related U.S. Application Data
[62] Division of Ser. No. 370,396, June 15, 1973, Pat. No. 3,834,458.

[52] U.S. Cl. .................. 219/301; 138/33; 165/46; 165/180; 219/549; 219/535; 338/214; 338/275
[51] Int. Cl.² .................. H05B 1/00; F28F 21/00
[58] Field of Search .......... 219/301, 535, 436, 438, 219/544, 536, 528, 549; 338/243–249, 275, 252, 253, 210–214; 137/341; 138/32, 33; 165/179–181, 46

[56] References Cited
UNITED STATES PATENTS

| | | | |
|---|---|---|---|
| 1,216,313 | 2/1917 | Heller | 219/436 |
| 1,460,815 | 7/1923 | Hynes | 338/244 X |
| 2,053,405 | 9/1936 | Myers | 338/275 X |
| 2,585,443 | 2/1952 | Cox | 219/301 UX |
| 2,777,300 | 1/1957 | Palmer | 219/301 UX |
| 2,923,803 | 2/1960 | Kueser | 338/247 X |
| 2,982,992 | 5/1961 | Brown et al. | 219/301 UX |
| 3,010,007 | 11/1961 | Theodore et al. | 219/544 X |
| 3,268,846 | 8/1966 | Morey | 219/528 X |
| 3,331,946 | 7/1967 | Bilbro | 219/301 X |

Primary Examiner—A. Bartis
Attorney, Agent, or Firm—Pravel & Wilson

[57] ABSTRACT

A pipe heat transfer assembly adapted to be easily and rapidly installed with unskilled in the field on a pipe to be heated or cooled includes an elongated rigid channel cover member and a separate elongated, pre-shaped, solid, flexible strip of thermoplastic resin heat transfer material having a first surface preshaped to conform closely to the inner cavity surface of the channel member and a second surface preshaped to conform closely to the shape of the pipe surface on which it is to be mounted. The strip of heat transfer material may be pre-shaped by molding or extruding. An elongated heat transfer element, which may be an electric heating wire or an elongated tube for a heat transfer liquid to flow therethrough, is embedded in the strip during such pre-shaping. Alternatively, a space for reception of the heat transfer element can be formed in the strip during the pre-shaping of the strip and the element subsequently installed in the space. The thermoplastic heat transfer material after preshaping remains solid and flexible without any significant flow within the temperature range of from about 10°F to about 120°F.

6 Claims, 4 Drawing Figures

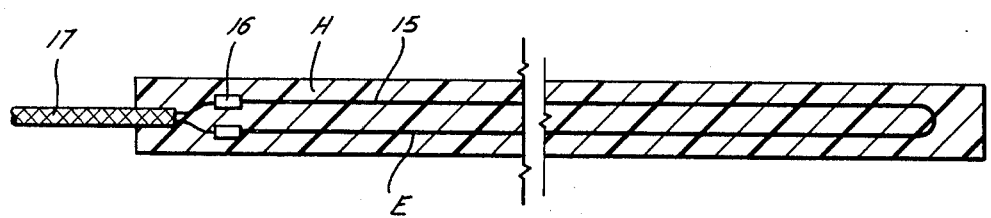
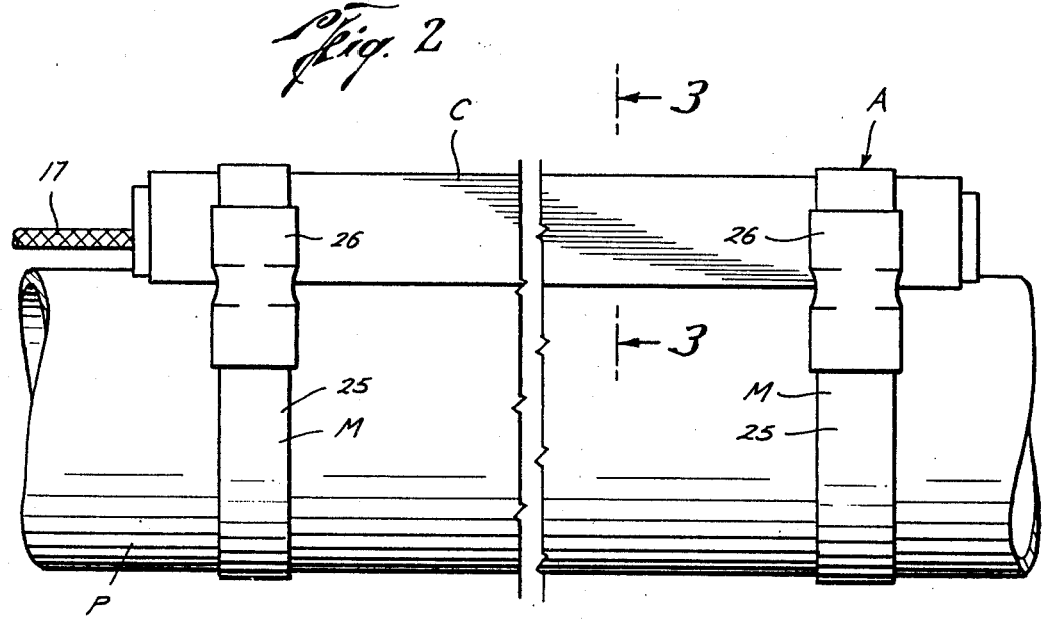
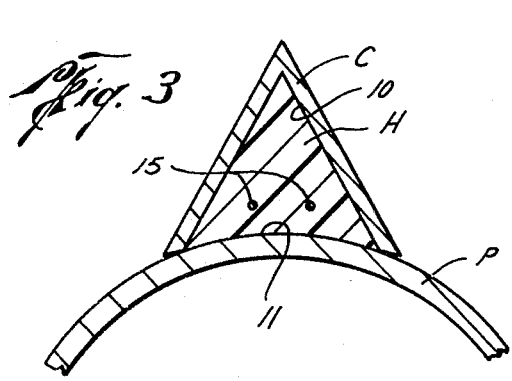
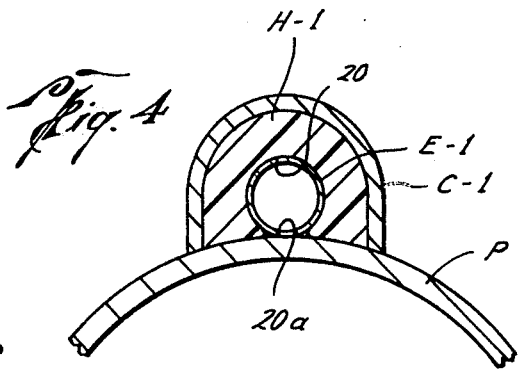

PIPE HEAT TRANSFER ASSEMBLY

CROSS REFERENCE TO RELATED APPLICATION

This application is a division of our copending U.S. patent application Ser. No. 370,396, filed June 15, 1973 now U.S. Pat. No. 3,834,458.

BACKGROUND OF THE INVENTION

The field of this invention is heat transfer apparatus, particularly for heating or cooling from a heat transfer element disposed externally on a pipe. The term "pipe" as used herein includes tubes, conduits or other members, the contents of which is to be heated or cooled by the heat transfer element.

U.S. Pat. No. 3,331,946 discloses a heat transfer assembly wherein the heat transfer material was placed in a channel member in a putty-like or plastic state. This was accomplished by pressing the channel member or applicator downwardly on top of the heat transfer material with the heat transfer element embedded therein. Although the objective was to eliminate undesirable air gaps in the heat transfer material and between the heat transfer element and the heat transfer material, it has been found that the efficiency and success depends upon the personnel handling the putty-like material, and therefore, the elimination of air gaps has been difficult and not dependable.

SUMMARY OF THE INVENTION

The present invention relates to a new and improved heat transfer assembly, wherein the elimination of air gaps is more positively accomplished, and errors due to personnel are more easily avoided. The heat transfer material, instead of being applied in a putty-like form in a channel is pre-shaped, by molding or extruding, usually with the heat transfer element embedded therein, or shaped with a cavity to closely conform to the heat transfer element. The heat transfer material is also pre-shaped externally to closely conform to the internal area of the channel member which is applied over the heat transfer material and element at the job site where the pipe to be heated or cooled is located. The invention further eliminates either the on the job site handling of the putty-like heat transfer material or the shipping of the channel members prefabricated with the heat transfer material and element, thereby facilitating shipping and handling as compared to the prior art.

BRIEF DESCRIPTION OF THE DRAWINGS

FIG. 1 is a horizontal sectional view illustrating one embodiment of the pre-shaped and pre-formed heat transfer material with a heat transfer element embedded therein;

FIG. 2 is a view illustrating the pre-shaped and pre-formed heat transfer material and heating element confined by a channel member with clamping straps holding the assembly on a pipe for heat transfer purposes;

FIG. 3 is a vertical sectional view taken on line 3 — 3 of FIG. 2; and

FIG. 4 is a vertical sectional view similar to that of FIG. 3, but illustrating a modified form of the invention, wherein the channel member and the components thereof are formed in a different shape from that of FIG. 3 to illustrate that the invention is not limited to any particular shape, and further showing a fluid conducting tube as the heat transfer element rather than the electrical resistance element of FIG. 3.

DESCRIPTION OF THE PREFERRED EMBODIMENTS

The present invention relates to a pipe heat transfer assembly generally designated with the letter A (FIG. 2) which is adapted to be mounted upon a pipe P. The term "pipe" is defined above and is intended to include various types of conductors or members for heat transfer purposes. Briefly, the heat transfer assembly includes a pre-shaped heat transfer material strip H, a heat transfer element E, a channel member C, and clamping members M for securing the assembly on the pipe P.

Considering the invention more in detail, the heat transfer material H is either extruded or molded, using a material which is capable of being preshaped, but which becomes solid and flexible and remains in such solid, flexible state so as to retain its preshaped form. The external shape of the heat transfer material H conforms to and preferably is identical with the cavity or recess 10 formed in the channel member C, and also the portion of the pipe P designated 11 (FIG. 3) which is defined by the channel member C. Since the heat transfer material H is flexible and resilient, it will be understood that the exact configuration of the external surface of the heat transfer material H does not have to be identical to the surfaces of the channel member C defining the internal recess or cavity 10 and the external pipe portion 11 since the material may yield and assume such shape after being confined on the pipe P by the channel member C. In any event, the heat transfer material H does have a cross-sectional shape which generally is substantially the same as that defined by the internal cavity or recess 10 of the channel member 10 and the pipe portion 11 so as to substantially fill such area without any air gaps or spaces therebetween.

It is also important to note that the extruding or molding of the heat transfer material H may be accomplished at a point remote from the field application of such heat transfer material H to the pipe P so that the material may be extruded or molded under enough pressure and force to assure that air pockets or bubbles or gaps within the material H are virtually eliminated from the strip of material H. This is a decided advantage over the application of the heat transfer material H in a putty-like or plastic form as in the prior art.

In the normal use of the present invention, the heat transfer element E is an electrical resistance wire 15 (FIG. 1) which is connected by any suitable means to an electrical terminal 16 and a lead-in wire 17, leading to a source of electrical power. The heat is provided by the element E in the known manner of electrical resistance heaters and such heat is transferred through the heat transfer material H to the pipe P which has a liquid or other material therein which is to be heated or maintained in a heated condition by the heat from the heat transfer element E.

Preferably, the heat transfer element E is passed through the extruder during the extruding of the heat transfer material H so that the material H and the element E are molded or are extruded as a unit as illustrated in FIG. 1. This provides for the assurance that the element E is embedded in the heat transfer material H so that air spaces or pockets around the heat transfer element E is avoided.

At this point, it should be noted that the heat transfer element E is not limited to an electrical resistance heater element such as shown in FIGS. 1 – 3, and therefore, a modified form of the invention is shown in FIG. 4, wherein a heat transfer element E-1 is disposed within heat transfer material H-1 which in turn is confined by a modified channel member C-1.

In such modified form of the invention illustrated in FIG. 4, the heat transfer material strip H-1 has the same general appearance as the strip H, except that the material strip H-1 is molded or extruded with a recess or cavity 20 therein for receiving the heat transfer element E-1, or any other heat transfer element such as the heat transfer element E. The recess or cavity 20 is predetermined so that when the heat transfer material H-1 is assembled with the heat transfer element E-1 or E, the material H-1 closely conforms to and effectively embeds the heat transfer element within the heat transfer material.

It should also be noted that although the heat transfer element E-1 is shown as being inserted from the bottom of the strip H-1 through a longitudinal space 20a for receiving the element E-1 in the recess or cavity, the material H-1 may be molded or extruded so that the heat transfer element E-1 or E is inserted longitudinally, thereby providing some of the heat transfer material between the element E-1 or E and the external surface of the pipe P.

The channel member C-1 has been shown with a different shape from the channel member C to illustrate that the invention is not limited to any particular shape of channel member or any particular external shape of the heat transfer material H or H-1. The channel members C and C-1 are preferably formed of metal or any other relatively strong material capable of confining the heat transfer material and also retaining its position on the pipe P.

For the purposes of holding the entire assembly A on the pipe P, the assembly includes the clamping bands M which are preferably of any conventional type such as steel bands 25 which extend around the pipe P and the channel member C or C-1 and which are affixed by bending a connector 26 to the ends of the band 25, as is well known. Any other clamping arrangement may be utilized so long as it retains the channel member C, the heat transfer material H and the heating element E, or the alternate form shown in FIG. 4, on the pipe P in the selected position.

It should also be understood that the two clamping members M illustrated are for illustration purposes only and a plurality of such members M may be employed, depending upon the length of the channel member C or C-1 which is being used. Also, it should be understood that more than one channel member may be employed with each of the strips H, or alternatively, more than one of the strips H may be employed with a single channel member.

Although the invention is illustrated with the electrical resistance heating element E for heating purposes, the modification shown in FIG. 4 illustrates the heat transfer element E-1 which may be used for either heating or cooling by passing the appropriate fluid therethrough.

Although the invention is not limited to any particular heat transfer material, by way of example, the strip H or H-1 may be formed of a material having the following general formula:

| | |
|---|---|
| Thermoplastic Binder | 10% – 80% (by weight) |
| Graphite (or other heat-conducting material) | 20% – 90% (by weight) |

The thermoplastic binders which may be used may be those in the broad classification of rubbers, such as butyl rubber, silicone rubber, nitrile, polyurethane, and acrylic resins. Also, the thermoplastic materials could include the polyamides and the polyamide copolymers, as well as the fluoroplastics, the polyethylenes, and the polysulfides.

The thermoplastic material would have a softening point of about 95°C. and a specific gravity of about 0.97. In any event, the heat transfer material in the strip H or H-1 would retain its shape and would not flow during exposure to the normal temperature range from about 10°F. to about 120°F. Also, the material remains flexible within such temperature range.

In the preferred embodiment of this invention, the heat transfer material in either the strip H or the strip H-1 has the following composition:

| | |
|---|---|
| Polyamide Resin softening point 160° – 170° C. specific gravity 0.98 | 35% – 45% (by weight) |
| N-Ethyl-o and p-Toluenesulfonamides | 9% – 11% |
| Graphite (or other heat-conducting material) | 40% – 50% |
| Paraffin wax (melting point 180° – 190° F.) | 4% – 6% |

All of the above percentages are by weight. In the foregoing example, the percentages are set forth as a range, but a specific product may have 40% of the polyamide resin, 10% of the sulfonamides, 45% of the graphite and 5% of the wax.

It should be understood that the foregoing are merely set forth by way of example and not by way of limitation.

The foregoing disclosure and description of the invention are illustrative and explanatory thereof, and various changes in the size, shape, and materials as well as in the details of the illustrated construction may be made without departing from the spirit of the invention.

I claim:

1. A heat transfer assembly adapted to be mounted in heat exchange relation with a heat transfer member, including:

a rigid elongated channel cover member;

a separate elongated preshaped, solid strip of thermoplastic resin heat transfer material having a first surface preshaped to conform closely to the shape of the inner cavity surface of the channel member and a second surface preshaped to conform closely to the shape of the surface of the heat transfer member with which it is to be mounted to eliminate air pockets or gaps between said heat transfer material and the heat transfer member surface, an elongated heat transfer element receiving cavity formed in said strip of heat transfer material adjacent said second surface, said heat transfer material after preshaping remaining solid and flexible without any significant flow within a temperature range of from about 10° F. to about 120° F.; and an elongated heat transfer element disposed in said heat transfer element cavity of said strip of heat transfer material and substantially conforming to the shape of said heat transfer element cavity, said cover member being secured to said heat transfer member with the elongated strip therebetween and with the second surface of the strip in contact with the surface of the heat transfer member.

2. The apparatus set forth in claim 1, wherein said heat transfer element comprises:

an electrical resistance heating wire extending longitudinally of the strip and completely surrounded by said heat transfer material.

3. The apparatus set forth in 1, wherein said heat transfer element comprises:

an elongated tube for a heat transfer liquid to flow therethrough.

4. The apparatus set forth in claim 1, wherein said thermoplastic resin heat transfer material comprises:
   a. a thermoplastic binder comprising from about 10 to about 80% by weight of said thermoplastic resin heat transfer material; and
   b. a heat conducting material comprising from about 20 to about 90% by weight of said thermoplastic resin heat transfer material.

5. The apparatus set forth in claim 1, wherein:

said heat transfer element cavity is formed adjacent to and communicates with said second surface.

6. The apparatus set forth in claim 1, wherein:

said heat transfer element cavity is formed adjacent to and in spaced non-communicating relation from said second surface.

* * * * *